(12) United States Patent
Wuebbolt-Gorbatenko et al.

(10) Patent No.: US 10,457,106 B2
(45) Date of Patent: Oct. 29, 2019

(54) DEVICE FOR LEVEL ADJUSTMENT FOR A MOTOR VEHICLE

(71) Applicant: SCHAEFFLER TECHNOLOGIES AG & CO. KG, Herzogenaurach (DE)

(72) Inventors: Benjamin Wuebbolt-Gorbatenko, Erlangen (DE); Daniel Faber, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/743,215

(22) PCT Filed: Jul. 11, 2016

(86) PCT No.: PCT/DE2016/200314
§ 371 (c)(1),
(2) Date: Jan. 9, 2018

(87) PCT Pub. No.: WO2017/016556
PCT Pub. Date: Feb. 2, 2017

(65) Prior Publication Data
US 2018/0208010 A1 Jul. 26, 2018

(30) Foreign Application Priority Data
Jul. 27, 2015 (DE) .................. 10 2015 214 161

(51) Int. Cl.
*B60G 15/06* (2006.01)
*F16H 25/22* (2006.01)
*B60G 17/02* (2006.01)

(52) U.S. Cl.
CPC ......... *B60G 15/062* (2013.01); *B60G 17/021* (2013.01); *F16H 25/2228* (2013.01);
(Continued)

(58) Field of Classification Search
CPC .. B60G 15/063; B60G 15/068; B60G 17/021; F16H 25/2228
See application file for complete search history.

(56) References Cited

U.S. PATENT DOCUMENTS 5,351,790 A * 10/1994 Machida .............. B60G 13/003
188/266.2
5,360,230 A * 11/1994 Yamada .............. B60G 17/018
188/314
(Continued)

FOREIGN PATENT DOCUMENTS

DE 102007060422 A1 6/2009
DE 102009057003 A1 6/2011
(Continued)

OTHER PUBLICATIONS

International Search Report for International Application No. PCT/DE2016/200314 dated Nov. 4, 2016.
(Continued)

*Primary Examiner* — Nicole T Verley
(74) *Attorney, Agent, or Firm* — Brooks Kushman P.C.

(57) ABSTRACT

A level adjustment device for a vehicle, comprising a damping device having a piston-cylinder unit and a screw drive, and an adapter sleeve that axially supports a spindle of the screw drive and includes a flange directed radially inwards, wherein the adapter sleeve is configured to utilize the screw drive and is decoupled in relation to a cylinder of the piston-cylinder unit via one or more elastic elements.

20 Claims, 4 Drawing Sheets

(52) U.S. Cl.
CPC .... *B60G 2202/312* (2013.01); *B60G 2202/42* (2013.01); *B60G 2204/4192* (2013.01); *B60G 2500/30* (2013.01); *B60G 2600/44* (2013.01)

(56) References Cited

U.S. PATENT DOCUMENTS

| | | | | |
|---|---|---|---|---|
| 6,220,408 | B1 * | 4/2001 | Pradel | B60G 15/06 188/314 |
| 7,780,177 | B2 * | 8/2010 | Michel | B60G 15/063 280/124.146 |
| 7,784,800 | B2 * | 8/2010 | Michel | B60G 7/04 267/175 |
| 8,205,864 | B2 * | 6/2012 | Michel | B60G 15/065 188/299.1 |
| 8,262,100 | B2 * | 9/2012 | Thomas | B60G 17/021 188/321.11 |
| 8,490,761 | B2 * | 7/2013 | Kondo | B60G 15/067 188/266.3 |
| 8,573,573 | B2 * | 11/2013 | Michel | B60G 15/068 267/218 |
| 8,770,593 | B2 * | 7/2014 | Moore | B60G 15/062 280/5.515 |
| 8,814,178 | B2 * | 8/2014 | Moore | B60G 17/0165 280/5.514 |
| 9,027,938 | B1 * | 5/2015 | Kasian | B60G 17/00 267/177 |
| 9,605,723 | B2 * | 3/2017 | Rehfus | B64C 25/44 |
| 9,694,643 | B2 * | 7/2017 | Mersmann | B60G 17/021 |
| 9,707,819 | B2 | 7/2017 | Dobre et al. | |
| 9,834,059 | B2 * | 12/2017 | Seminara | B60G 11/15 |
| 2017/0241526 | A1 * | 8/2017 | Drennen | F16H 25/2204 |

FOREIGN PATENT DOCUMENTS

| | | | | |
|---|---|---|---|---|
| DE | 102012213275 | A1 * | 1/2014 | ............ B60G 15/068 |
| DE | 102013222648 | A1 * | 5/2015 | ............ B60G 15/02 |
| DE | 102017130073 | B3 * | 11/2018 | ............ B60G 17/02 |
| EP | 1953013 | A2 | 8/2008 | |
| WO | 2015021952 | A1 | 2/2015 | |
| WO | WO-2017025090 | A1 * | 2/2017 | ........... B60G 15/063 |

OTHER PUBLICATIONS

Office Action for German Application No. 102015214161.6, dated Apr. 1, 2016, 8 Pages.

* cited by examiner

180# DEVICE FOR LEVEL ADJUSTMENT FOR A MOTOR VEHICLE

CROSS-REFERENCE TO RELATED APPLICATIONS

This application is the U.S. National Phase of PCT/DE2016/200314 filed Jul. 11, 2016, which claims priority to DE 102015214161.6 filed Jul. 27, 2015, the entire disclosures of which are incorporated by reference herein.

TECHNICAL FIELD

The disclosure relates to a device for level adjustment for a motor vehicle, comprising a damping device having a piston-cylinder unit and a screw drive, comprising a spindle and a nut that is mounted on the spindle via rolling elements, to which a disc that is supporting a spring of the damping device is coupled, wherein the nut can be moved axially along the spindle.

BACKGROUND

In modern motor vehicles, it is more and more common to use devices for a level adjustment, by which the chassis can be lifted or lowered in relation to the chassis suspension. Such a device includes a damping device with a piston-cylinder unit, that is arranged between the wheel-carrier and the chassis, where it is decoupled via a strut bearing. The piston-cylinder unit comprises a spring, whose base point is e.g. adjustable by using a ball screw drive, in order to regulate the level. For this purpose, the spring is supported on a disc, which is coupled by using a nut of the ball screw drive. The nut can be actively turned by using a drive mechanism, so that it can move along the stationarily fixed spindle of the ball screw drive in axial direction. The disc is also moved by using this axial motion of the nut, and along with it the spring. The described arrangement can be varied in such a way that the spindle of the screw drive is actuated.

For the installation of the ball screw drive, which may comprise a corresponding drive mechanism, or to which such a mechanism is aligned, it is thus far customary, to push a spacing sleeve onto the piston-cylinder unit, or the suspension strut, wherein the spacing sleeve rests with its lower end on the wheel-carrier and on which the ball screw drive is supported on its upper end. An adapter sleeve is furthermore pushed onto the cylinder of the piston-cylinder unit, since the outer diameter of the cylinder features great tolerances and due to which it is not possible that the ball screw drive or its hollow cylindrical spindle can be directly placed or mounted onto the cylinder.

Thus, such a level adjustment device has an elaborate design when it comes to the needed components and its installation is complicated. Furthermore, there is the problem that the level adjustment device is acoustically coupled to the chassis suspension via the spacing sleeve and the adapter sleeve, which can have negative effects in view of a possible noise generation.

A device for a level adjustment in accordance with the characteristics of the preamble of claim 1 has become known from the DE 10 2009 057 003 A1. The damping pipe 52 of the cylinder is mounted in this case with its pin-like extension 56a on the strut side via a damping bearing 22. The damping pipe 56 can freely swing with the damping bearing 22 and is fully decoupled from any components with regards to vibrations that are supported via the suspension strut bearing 20 on the motor vehicle suspension side.

SUMMARY

It is thus the objective of the disclosure to present an improved device for a level adjustment of a motor vehicle in this regard, with simple means for an adjusting at the motor vehicle. In line with the disclosure, this objective is accomplished as disclosed below. An adapter sleeve that is introduced into the spindle and which is axially supporting the same is provided with a flange that is directed radially inwards, which is axially supported on the cylinder of the piston-cylinder unit via the flange, wherein the adapter sleeve and the cylinder that is mounted on the wheel-carrier side are secured to one another so that they cannot rotate, and wherein the adapter sleeve is acoustically decoupled in relation to the cylinder via at least one elastic element.

The mounting of the cylinder on the wheel-carrier side can be carried out as a fixed connection with the wheel-carrier or also as a swivel-motion-like bearing at the wheel-carrier, depending on the application.

The adapter sleeve and the cylinder are rotationally fixed towards each other, which can be achieved e.g. by using a recess that is prepared on the flange, into which a projection on the cylinder can engage, or vice versa. This ensures that any relative motion around the longitudinal axis between the adapter sleeve and the cylinder is impossible. The elastic element that is arranged between the adapter sleeve and the cylinder can be made in a very simple way. Rotational movements between the adapter sleeve and the cylinder are not intended, so that the elastic element is primarily only subject to pressure and takes care of the acoustic decoupling.

The level adjustment device according to the disclosure merely comprises one adapter sleeve, by using the screw drive, e.g. a ball screw drive, is supported on the vehicle suspension side. The adapter sleeve is therefore inserted into the hollow spindle of the screw drive, wherein the spindle is axially supported on the adapter sleeve in a mechanical way, which can be achieved e.g. by using a collar or flange which is formed on the sleeve-side, radially directed towards the outside. At its upper end, the adapter sleeve features a flange that is radially directed towards the inside. The adapter sleeve is axially supported on the cylinder via this flange, through which piston rod of the piston-cylinder unit runs, which may be at the upper end face or the upper collar of the cylinder.

Due to the axial support of the spindle on the adapter sleeve and the simultaneous axial support of the adapter sleeve on the cylinder, the adjusting system is thus supported in its entirety towards the vehicle suspension or respectively towards the wheel-carrier via this one adapter sleeve. Advantageously, there is no need for any further adapter sleeve or the like. This is because the system is axially secured via this one adapter sleeve and it is positioned at a defined distance in relation to the wheel-carrier, i.e. the adapter sleeve performs a double function, which is the supporting and the positioning.

In line with the disclosure, it is intended that the adapter sleeve is acoustically decoupled towards the cylinder via at least one elastic element. This means that it is ensured by means of this elastic element that there is no direct contact between the adapter sleeve and the cylinder of the damping device. A simple acoustic decoupling is thus possible in this way, since the adapter sleeve is basically a defined interface towards the vehicle suspension or to the wheel-carrier, respectively, in the area in which an acoustic decoupling of the screw drive or of the overall system occurs towards the vehicle suspension.

The installation and components expenditure is remarkably lower than that for systems that are known so far. This is the case because it is only necessary to insert and install the adapter sleeve, which ultimately can be designed with a diameter that is independent of the exact diameter of the used cylinder, since it anyway is not in contact with the cylinder and is acoustically decoupled from it via the elastic element.

According to a first design of the disclosure, the elastic element can be a ring, which is arranged between the flange of the adapter sleeve and the cylinder or the upper cylinder end face, respectively. This ring, which may be made of rubber or an elastomer, can either be inserted into this section as a separate ring. But it is also possible to e.g. glue it either to the upper side of the cylinder or to the inner side of the flange of the adapter sleeve. This means that a decoupling of the adapter sleeve towards the cylinder in the area between the flange and the cylinder, where both are axially supported, is provided using the elastic element. It is not necessary to insert a ring. It would also be possible to provide several local, relatively small elastic elements (as to their surface size) in this area in a distributed arrangement, in order to realize an acoustic decoupling.

In further development of the disclosure, it is possible to provide a further elastic element in form of a ring or a sleeve, which decouples the adapter sleeve towards the outer cylinder wall. The adapter sleeve features a certain length, since it runs at least partly through the spindle of the screw drive, which spindle is axially supported on the adapter sleeve, as it was described. For this reason, it is practical if a second acoustic decoupling level is realized, in that the adapter sleeve is acoustically decoupled towards the outer cylinder wall via a further elastic element, e.g. a further elastic ring or an elongated sleeve. This ring or sleeve may be arranged in the area of the lower end of the adapter sleeve, so that the two acoustic decoupling levels are positioned with a maximum distance and that no contact can occur towards the outer cylinder wall, even if there is a slight tilting of the adapter sleeve in the area of its lower end. In addition to the acoustic decoupling, the ring or the sleeve also serves for the centering of the adapter sleeve on the cylinder.

The ring or sleeve can hereby be e.g. pressed or glued into the adapter sleeve, which may be arranged at the adapter sleeve in such a way that it cannot be lost. The adapter sleeve may be arranged with a chamber in the area of its lower end, which makes it easier to insert or press the ring or sleeve, which is also made of rubber or an elastomer, into the adapter sleeve.

As an alternative to the use of two separate elastic elements, which serve for an acoustic decoupling, it is also possible to fully cushion the inner side of the adapter sleeve with an elastomer coating, so that a fully covered acoustic decoupling can be achieved. The entire adapter sleeve is supported on the cylinder via this elastomer coating, so that a contact between the metal adapter sleeve and the metal cylinder is prevented from the outset.

As it was described, the spindle of the screw drive is axially supported on the adapter sleeve. In order to realize this support in a simple manner, the adapter sleeve can feature a support collar that is protruding radially towards the outside, on which the spindle is axially supported. This support collar may be arranged on the lower end of the adapter sleeve. Since the adapter sleeve features a defined length and is supported on the cylinder with its upper flange, the position of the support collar provides a defined distance of the ball screw drive towards the wheel-carrier. Instead of such a support collar, it would generally also be possible to equip the spindle with a flange that is pulled radially towards the inside at its upper end, which in turn is axially supported at the flange of the adapter sleeve. The outer diameter of the adapter sleeve and the inner diameter of the spindle are adjusted towards each other, so that the spindle sits on the adapter sleeve with the least possible clearance.

Since the spindle is fixed in its position, it may also provide a securing against rotation between the spindle and the adapter sleeve. This can be realized by utilizing an axially directed projection at the support collar and a recess at the spindle, which can accommodate this projection, or vice versa. If no such support collar is provided, but rather a spindle-sided support flange, the projection can be realized at this support flange and the recess at the sleeve-sided flange, or vice versa.

BRIEF DESCRIPTION OF THE DRAWINGS

Further advantages and details of the disclosure can be derived from the embodiments described in the following as well as by the drawings. It is shown.

DETAILED DESCRIPTION

Figure 1:
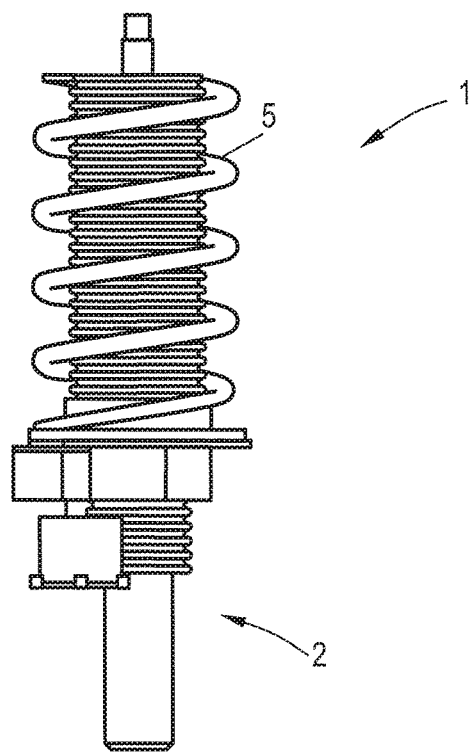
FIG. 1 is a side view of a device according to the disclosure for a level adjustment.
Figure 2:
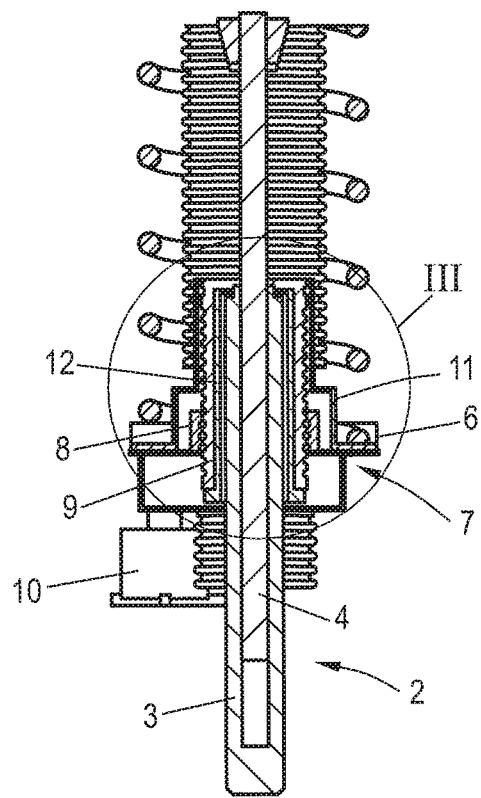
FIG. 2 is sectional view through the device from FIG. 1.

FIG. 1 depicts a device 1 for a level adjustment of a motor vehicle, comprising a piston-cylinder unit 2 with a cylinder 3 and a piston 4 that can be moved within it, which is connected to the chassis via a strut bearing in a manner that is not depicted in further detail, while the cylinder 3 is connected to the wheel-carrier side in a manner that is not depicted in further detail.

A spring 5 is furthermore provided, which compresses and rebounds in the generally well-known manner during operation, wherein this movement is dampened via the piston-cylinder unit 2, which represents a damping device. Spring 5 is supported with its base point on a disc 6, which in turn is axially movable via a ball screw drive, so that the spring base point can be lifted or lowered for a level adjustment. As an alternative to the ball screw drive, other types of screw drives can also be used.

The ball screw drive 7 comprises a nut 8, which is moved up and down in axial direction on a spindle 9, being guided by using balls, wherein the spindle is in a fixed position. The nut 8 is actively operated via a drive mechanism 10. Nut 8 and the drive mechanism 10 are accommodated in a common housing 11, to which disc 6 is aligned, so that the disc is coupled with the nut and this entire unit moves in axial direction during the level adjustment.

The ball screw drive 7 is supported and acoustically decoupled towards cylinder 3 via an adapter sleeve 12. Adapter sleeve 12, which may be a simple deep drawn component, features a flange 13 at its upper end which is radially drawn towards the inside, on which it is axially supported on the upper end face 14 of the cylinder 3. An elastic element 15, here in form of an elastomer or rubber ring, is inserted between flange 13 and the end face 14. This elastic element 15 serves for the acoustic decoupling of the adapter sleeve 12 from cylinder 3.

Figure 3:
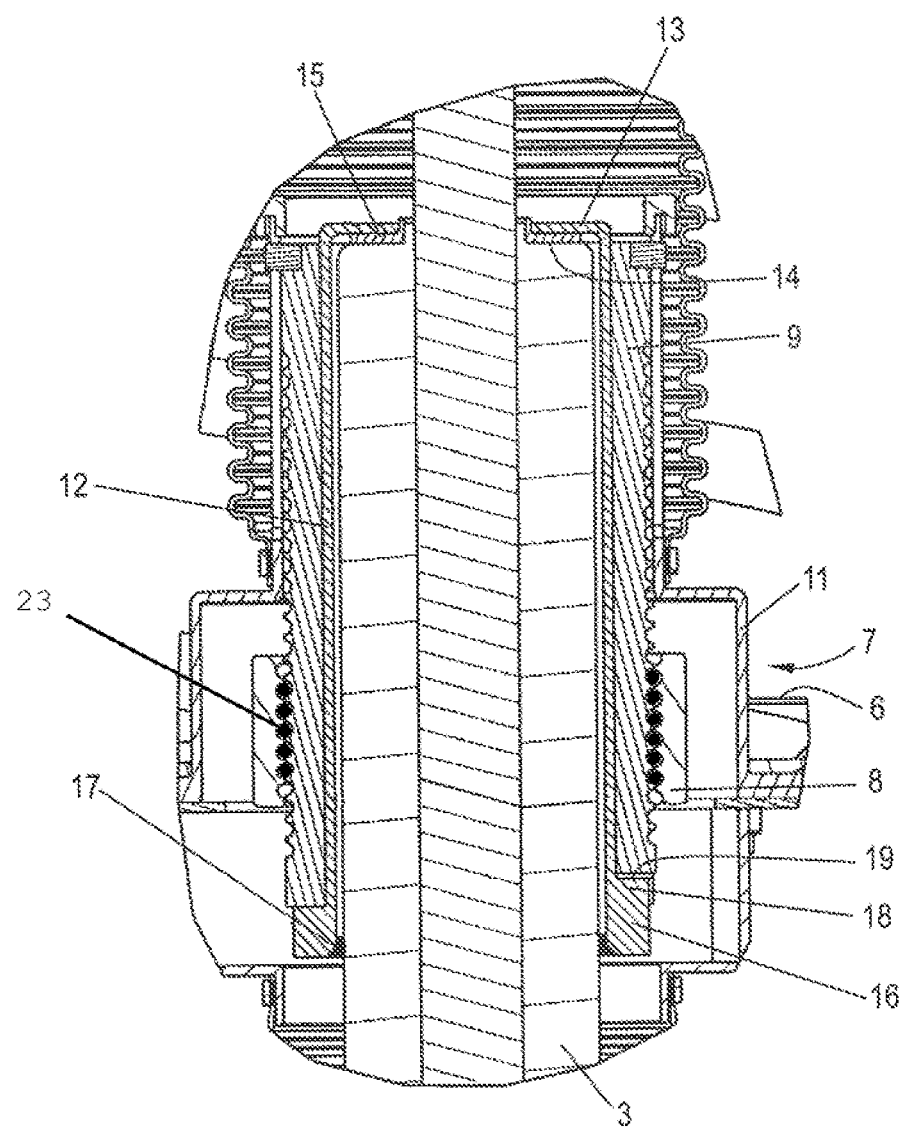
FIG. 3 is an enlarged detailed view of the section III from FIG. 2.

A support collar 16 in form of a flange, which is radially directed towards the outside, is formed at the lower end of adapter sleeve 12, and spindle 9 of the ball screw drive 7 is axially supported on that flange. As it is depicted in FIG. 3, spindle 9 is a hollow cylindrical component, into which adapter sleeve 12 is inserted with the least possible clearance. The lower end of spindle 9 rests on the support collar 16, by which using the axial support of spindle 9 is realized.

Thus, by using one adapter sleeve 12, (i.e. one single component) spindle 9 is axially supported on the one hand, but on the other hand the support for the entire level adjustment system towards cylinder 3 is also accomplished.

Furthermore, another elastic element 17 is provided in the area of the support collar 16 in form of a pressed in or glued in ring that is made of rubber or an elastomer, by which using the elastic element 17 defines a second acoustic decoupling level. This may be the case because adapter sleeve 12 is decoupled towards the outer cylinder wall by which using this element. This means that using the adapter sleeve 12 is completely decoupled acoustically towards cylinder 3 via using these two elastic elements 15 and 17, so that any possible noise generating vibrations cannot be passed on over these.

Figure 4:
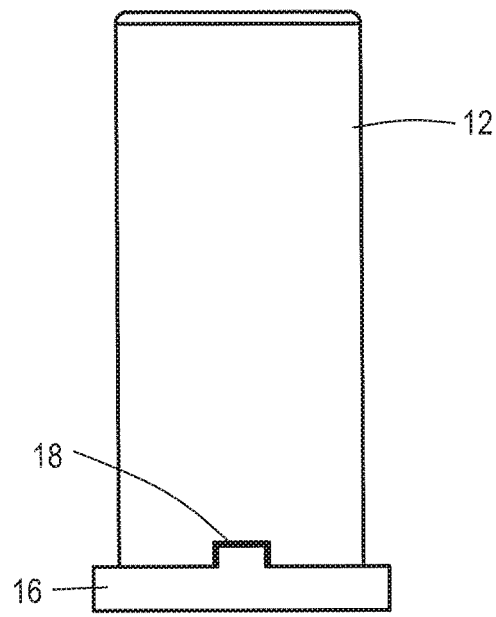
FIG. 4 is a side view of the adapter sleeve.

FIG. 4 depicts a side view of adapter sleeve 12. The support collar 16 features an axially directed projection 18, which, as it can be seen in FIG. 7, engages into a corresponding recess 19 at the lower end face of spindle 9. The securing against rotation of the spindle 9 in relation to adapter sleeve 12 is ensured in this way.

Figure 5:
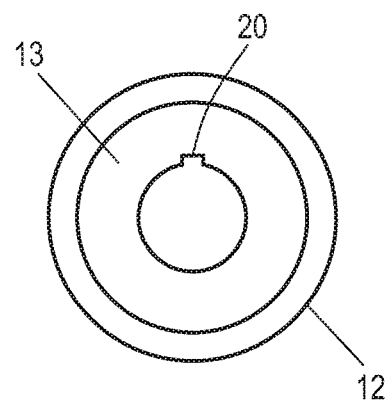
FIG. 5 is a top view onto the adapter sleeve.
Figure 6:
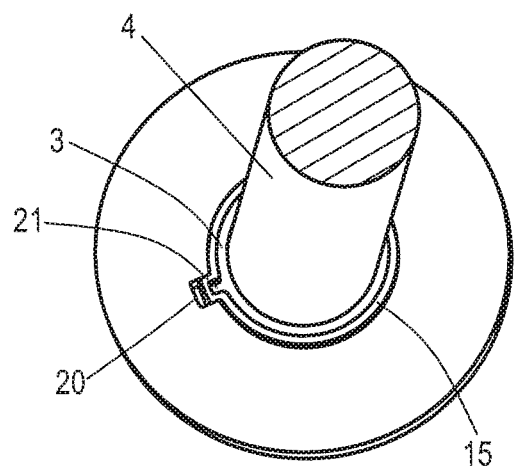
FIG. 6 is a detailed depiction of the device with a view on the elastic ring that defines the upper decoupling level.

FIG. 5 depicts a top view onto the adapter sleeve 12 with a view onto flange 13. It features a radial recess 20 into which, as shown in FIG. 6, a radial projection 21 formed at the upper end of cylinder 3, engages. This realizes a securing against rotation of adapter sleeve 12 in relation to cylinder 3.

FIG. 6 illustrates a further example for the configuration of a first elastic element 15, which is placed between flange 13 and the cylinder end face 14. While this element 15 in FIG. 3 is designed as a flat and quite broad ring, the element 15 in FIG. 6 is designed as a narrow and in cross-section e.g. round ring. Independent of the specific geometry, an acoustic decoupling in this area is ensured in any case.

Figure 7:
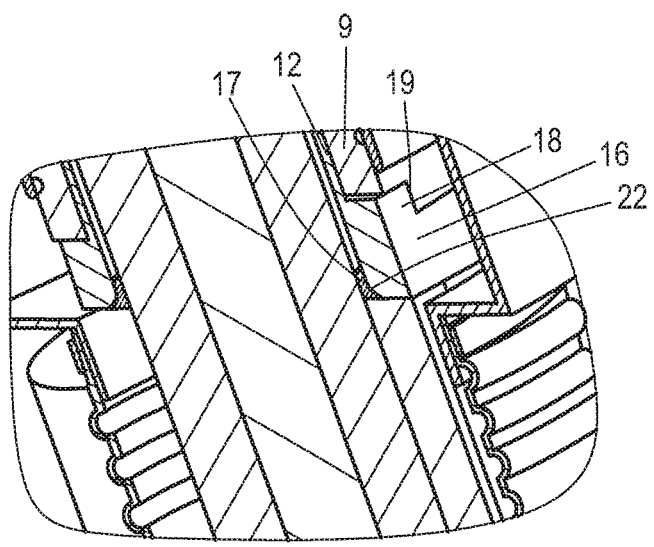
FIG. 7 is a sectional view of the support of the spindle of the ball screw drive at the adapter sleeve.

In an enlarged detailed view, FIG. 7 depicts in addition to the supporting section of spindle 9 at adapter sleeve 12 also the second elastic element 17, which is provided at the lower end of adapter sleeve 12. Adapter sleeve 12 features a lead-in bevel or chamfer 22 in this area, which makes it possible that the elastic element 17, e.g. in form of a ring, can be inserted or respectively pressed or glued into adapter sleeve 12. By using this elastic element 17, the adapter sleeve is supported and acoustically decoupled towards cylinder wall 3 in the area of its lower end. Instead of such a relatively short ring (when seen in axial direction), the elastic element 17 can also be implemented by using an elongated rubber or elastomer sleeve. It would generally also be possible to apply a rubber or elastomer coating for the entire inner surface of adapter sleeve 12 including the flange 13, so that a complete, large area decoupling can be provided.

The adaptation for a level adjustment device according to the disclosure is overall a simple concept, since only one component is needed to mount the adjustment system in a defined position in relation to the wheel-carrier and to axially support it, so that all the forces and torques that are introduced via spring 5 can be absorbed. Furthermore, an acoustic decoupling of the adapter sleeve towards the cylinder is realized in the area of the adapter sleeve, so that the adjustment system is altogether acoustically decoupled towards the wheel-carrier.

LIST OF REFERENCE SIGNS

1 Device
 2 Piston-cylinder unit
 3 Cylinder
 4 Piston Spring
 6 Disc
 7 Screw drive
 8 Nut
 9 Spindle
 10 Drive mechanism
 11 Housing
 12 Adapter sleeve
 13 Flange
 14 End face
 15 Elastic element
 16 Support collar
 17 Elastic element
 18 Projection
 19 Recess
 20 Recess
 21 Projection
 22 Chamfer

The invention claimed is:

1. A device for a level adjustment of a motor vehicle comprising:
 a damping device having a piston-cylinder unit and a screw drive that includes a spindle and a nut that is mounted on the spindle via rolling elements, to which a disc that is carrying a spring of the damping device is coupled, wherein the nut can be moved axially along the spindle, wherein an adapter sleeve axially supports the spindle and is provided with a flange that is directed radially inwards and which is axially supported on a cylinder of the piston-cylinder unit via the flange, wherein the adapter sleeve and the cylinder that is mounted on a wheel-carrier side are secured to one another so that the adapter sleeve and the cylinder cannot rotate, and wherein the adapter sleeve is decoupled in relation to the cylinder via at least one elastic element.

2. The device of claim 1, wherein the elastic element is a ring arranged between the flange and the cylinder.

3. The device of claim 1, wherein a further second elastic element in form of a ring or a sleeve is provided, wherein the second elastic element decouples the adapter sleeve towards an outer cylinder wall.

4. The device of claim 3, wherein the ring or the sleeve is arranged in an area of the lower end of the adapter sleeve.

5. The device of claim 4, wherein a recess is provided at the flange into which a projection engages which is provided at the cylinder.

6. The device of claim 1, wherein the adapter sleeve features a support collar that is protruding radially towards the outside, on which the spindle is supported.

7. The device of claim 1, wherein the spindle and the adapter sleeve are secured against rotation towards each other.

8. The device of claim 1, wherein an axially directed projection is provided at a support collar and engages into a recess at the spindle.

9. A level adjustment device for a vehicle, comprising:
- a damping device having a piston-cylinder unit and a screw drive; and
- an adapter sleeve that axially supports a spindle of the screw drive and includes a flange directed radially inwards, wherein the adapter sleeve is configured to utilize the screw drive and is decoupled in relation to a cylinder of the piston-cylinder unit via one or more elastic elements.

10. The level adjustment device of claim 9, wherein the adapter sleeve is axially supported on the cylinder of the piston-cylinder unit via the flange.

11. The level adjustment device of claim 10, wherein the adapter sleeve and the cylinder that is mounted on a wheel-carrier side are secured to one another so that they cannot rotate.

12. The level adjustment device of claim 9, wherein the adapter sleeve is decoupled in relation to the cylinder utilizing at least one elastic element.

13. The level adjustment device of claim 9, wherein the spindle and a nut are mounted on rolling elements.

14. The level adjustment device of claim 13, wherein the nut is configured to move axially along the spindle.

15. The level adjustment device of claim 9, wherein the adapter sleeve includes a radial recess and a radial projection formed at the cylinder, wherein the recess and radial projection are configured to engage to secure against rotation of the adapter sleeve in relation to the cylinder.

16. The level adjustment device of claim 9, wherein the spindle and the adapter sleeve are secured against rotation towards each other.

17. The level adjustment device of claim 9, wherein the adapter sleeve includes a support collar that protrudes radially outward.

18. A level adjustment device for a vehicle, comprising:
- a screw drive that includes:
  - an adapter sleeve that axially supports a spindle that includes a flange, wherein the flange is directed radially inwards towards the spindle, wherein the adapter sleeve is configured to decouple to a cylinder utilizing an elastic element; and
  - a nut configured to move up and down in an axial direction on the spindle.

19. The level adjustment device for a vehicle of claim 18, where in the nut is configured to be operated by a drive mechanism.

20. The level adjustment device for a vehicle of claim 19, wherein the nut and the drive mechanism are in a common housing.

* * * * *